United States Patent
Wang

(10) Patent No.: US 8,292,485 B2
(45) Date of Patent: Oct. 23, 2012

(54) LIGHT PEN

(75) Inventor: Yin Wang, Taichung County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 557 days.

(21) Appl. No.: 12/643,944

(22) Filed: Dec. 21, 2009

(65) Prior Publication Data

US 2011/0075440 A1 Mar. 31, 2011

(30) Foreign Application Priority Data

Sep. 28, 2009 (TW) ................... 98217891 U

(51) Int. Cl.
*B43K 29/00* (2006.01)

(52) U.S. Cl. ........ 362/579; 362/109; 362/118; 362/259; 362/553; 362/577; 353/42

(58) Field of Classification Search .......... 362/109, 362/118, 259, 553, 577, 579; 353/42; 372/101, 372/107, 108; 235/472.01, 472.03; 359/202.1, 359/210.1

See application file for complete search history.

(56) References Cited

U.S. PATENT DOCUMENTS

| 6,231,204 | B1 * | 5/2001 | Lo | 362/118 |
| 7,093,950 | B2 * | 8/2006 | Kui | 362/118 |
| 7,160,045 | B2 * | 1/2007 | Oas | 401/195 |
| 2002/0141204 | A1 * | 10/2002 | Gao | 362/570 |
| 2004/0161288 | A1 * | 8/2004 | Tsai | 401/195 |
| 2005/0117329 | A1 * | 6/2005 | Lin | 362/118 |
| 2007/0041177 | A1 * | 2/2007 | Lin | 362/118 |
| 2008/0165524 | A1 * | 7/2008 | Huang | 362/118 |
| 2008/0198581 | A1 * | 8/2008 | Lee et al. | 362/118 |
| 2009/0196021 | A1 * | 8/2009 | Liu | 362/118 |

* cited by examiner

*Primary Examiner* — Diane Lee
*Assistant Examiner* — Mary McManmon
(74) *Attorney, Agent, or Firm* — Winston Hsu; Scott Margo

(57) ABSTRACT

A light pen includes a case, a light source, a pen-nib structure, a first lens device, an elastic piece, a hollow knob, and a linkage pipe. The pen-nib structure is disposed through the case. The first lens device is disposed between the light source and the pen-nib structure. The elastic piece is connected to the first lens device. The hollow knob rotatably sheathes the first lens device. The linkage pipe sheathes the first lens device and is connected to the hollow knob for driving the elastic piece to move away from the pen-nib structure when the hollow knob rotates to a first position, so that the pen-nib structure can move relative to the case. The linkage pipe is further used for being separate from the elastic piece when the hollow knob rotates to a second position, so that the elastic piece can be engaged with the pen-nib structure.

17 Claims, 8 Drawing Sheets

LIGHT PEN

BACKGROUND OF THE INVENTION

1. Field of the Invention

The present invention relates to a light pen, and more specifically, to a light pen capable of adjusting a beam area of a light source projected on an optical touch panel.

2. Description of the Prior Art

In general, a beam projected by a light pen is usually utilized as input of photo signals to a conventional optical touch panel, and light sensing elements disposed inside the optical touch panel are utilized for sensing the said photo signals. As far as input of X-axis and Y-axis information to the optical touch panel is concerned, the optical touch panel utilizes photo TFTs (Thin Film Transistors) disposed therein to determine locations of the photo signals by transforming the photo signals into corresponding photo currents, so that a user can perform X-axis and Y-axis operations on the optical touch panel (e.g. moving a cursor, or rolling a scroll). On the other hand, for input of Z-axis information to the optical touch panel, the optical touch panel calculates Z-axis information according to a beam area of the light pen projected thereon so that a pen pressure generated by the user can be determined accordingly. In such a manner, the user can perform Z-axis operations on the optical touch panel (e.g. selecting a function icon). In summary, via the said sensing method, the user can directly perform the said operations on the optical touch panel by a light pen without pressing the optical touch panel.

The said light pen usually projects a beam of a fixed area. Therefore, if the user wants to adjust the beam area of the light pen projected on the optical touch panel for performing Z-axis operations (e.g. selecting a function icon), the user needs to hold the light pen in mid-air and then adjust a position of the light pen relative to the optical touch panel so as to change the beam area. However, since the user needs to hold the light pen in mid-air, the said method usually makes the user incapable of inputting Z-axis information steadily and operational problems may therefore occur (e.g. incorrect sensing of the optical touch panel).

SUMMARY OF THE INVENTION

The present invention provides a light pen comprising a case; a light source disposed in the case for emitting light; a pen-nib structure movably disposed through an end of the case, an opening being formed on the pen-nib structure; a first lens device movably disposed between the light source and the pen-nib structure for guiding the light emitted by the light source to the opening; an elastic piece connected to the first lens device for engaging with the pen-nib structure to fix a position of the pen-nib structure relative to the first lens device; a hollow knob rotatably sheathing the first lens device; and a linkage pipe sheathing a side of the first lens device and connected to the hollow knob, the linkage pipe being used for driving the elastic piece to move away from the pen-nib structure when the hollow knob rotates to a first position relative to the first lens device so that the pen-nib structure is capable of moving relative to the case and for being separate from the elastic piece when the hollow knob rotates to a second position so as to cause the elastic piece to engage with the pen-nib structure.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . "

Figure 1:
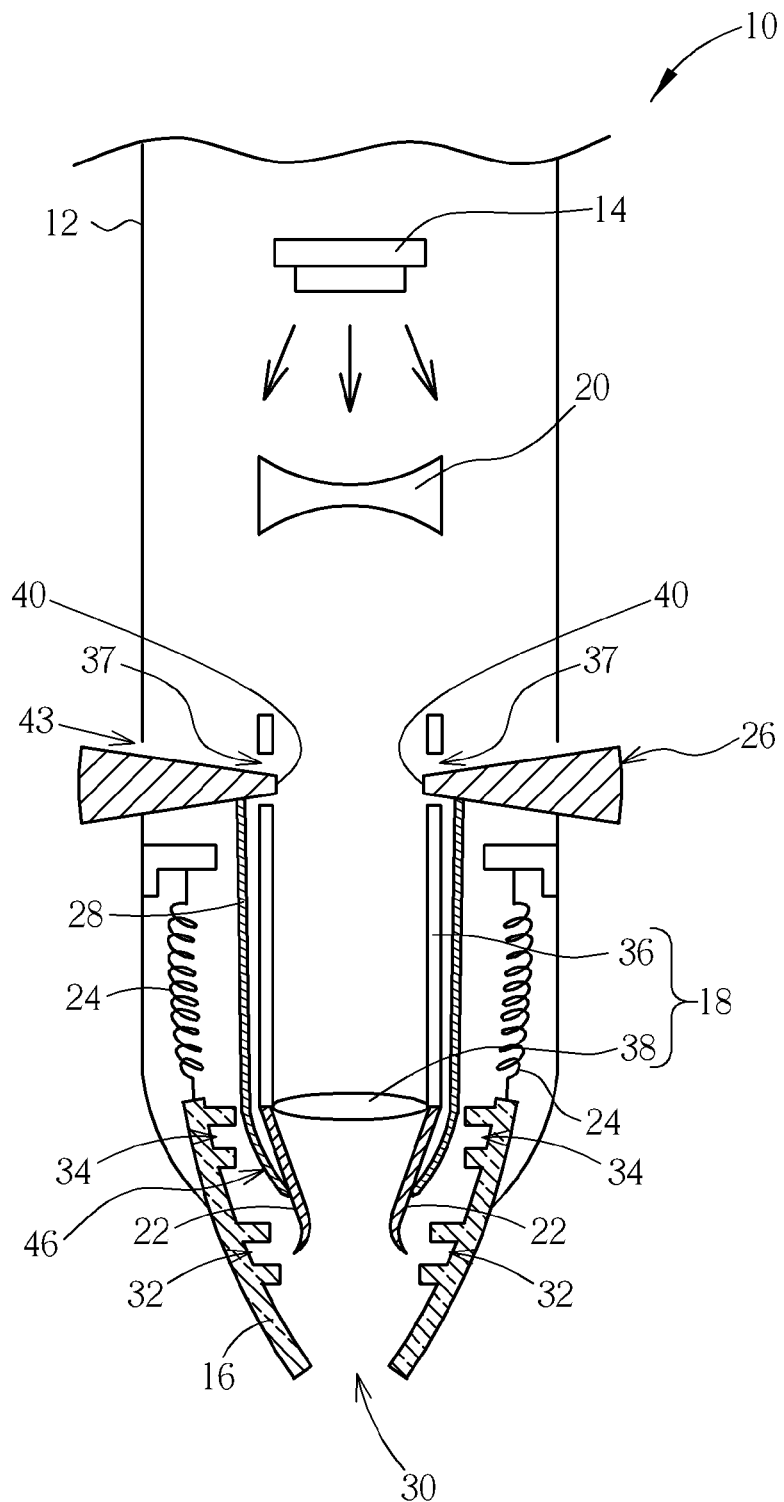
FIG. 1 is a cross-sectional diagram of a light pen according to a preferred embodiment of the present invention.

Please refer to FIG. 1, which is a cross-sectional diagram of a light pen 10 according to a preferred embodiment of the present invention. As shown in FIG. 1, the light pen 10 includes a case 12, a light source 14, a pen-nib structure 16, a first lens device 18, a second lens device 20, at least one elastic piece 22 (two shown in FIG. 1), at least one spring 24 (two shown in FIG. 1), a hollow knob 26, and a linkage pipe 28. The light source 14 is disposed inside the case 12. In this embodiment, the light source 14 may be a light source commonly applied for a light pen, such as a laser light source or an LED (Light Emitting Diode) light source. The pen-nib structure 16 is movably disposed through an end of the case 12, meaning that the pen-nib structure 16 is capable of moving relative to the case 12. An opening 30 is formed on the pen-nib structure 16, wherein light of the light source 14 can emit out through the opening 30. Furthermore, as shown in FIG. 1, at least one first positioning slot 32 (two shown in FIG. 1) and at least one second positioning slot 34 (two shown in FIG. 1) are both formed on the pen-nib structure 16. The first lens device 18 is movably disposed between the light source 14 and the pen-nib structure 16. The first lens device 18 is used for guiding the light of the light source 14 to the opening 30. As shown in FIG. 1, the first lens device 18 includes a light guide pipe 36 and a first lens 38. The light guide pipe 36 is disposed through the hollow knob 26 and is connected to the elastic piece 22. At least one engaging hole 37 (two shown in FIG. 1) is formed on the light guide pipe 36. The light guide pipe 36 is used for guiding the light emitted by the light source 14. The first lens 38 is connected to the light guide pipe 36. The first lens 38 is used for refracting the light guided by the light guide pipe 36 to the opening 30. In this embodiment, the first lens 38 is preferably a convex lens for light condensing. The elastic piece 22 is connected to the light guide pipe 36. The elastic piece 22 is used for engaging with the first positioning slot 32 of the pen-nib structure 16 so as to fix a position of the pen-nib structure 16 relative to the light guide pipe 36. The second lens device 20 is fixed to the case 12 and is located between the first lens device 18 and the light source 14. The second lens device 20 is used for guiding light emitted by the light source 14 to the light guide pipe 36. In this embodiment, the second lens device 20 is preferably a concave lens for refracting the light emitted by the light source 14 to the first lens device 18. The spring 24 is connected to the pen-nib structure 16 and the case 12. The spring 24 is used for providing elastic force to the pen-nib structure 16 so that the pen-nib structure 16 can move back and forth relative to the case 12.

Figure 2:
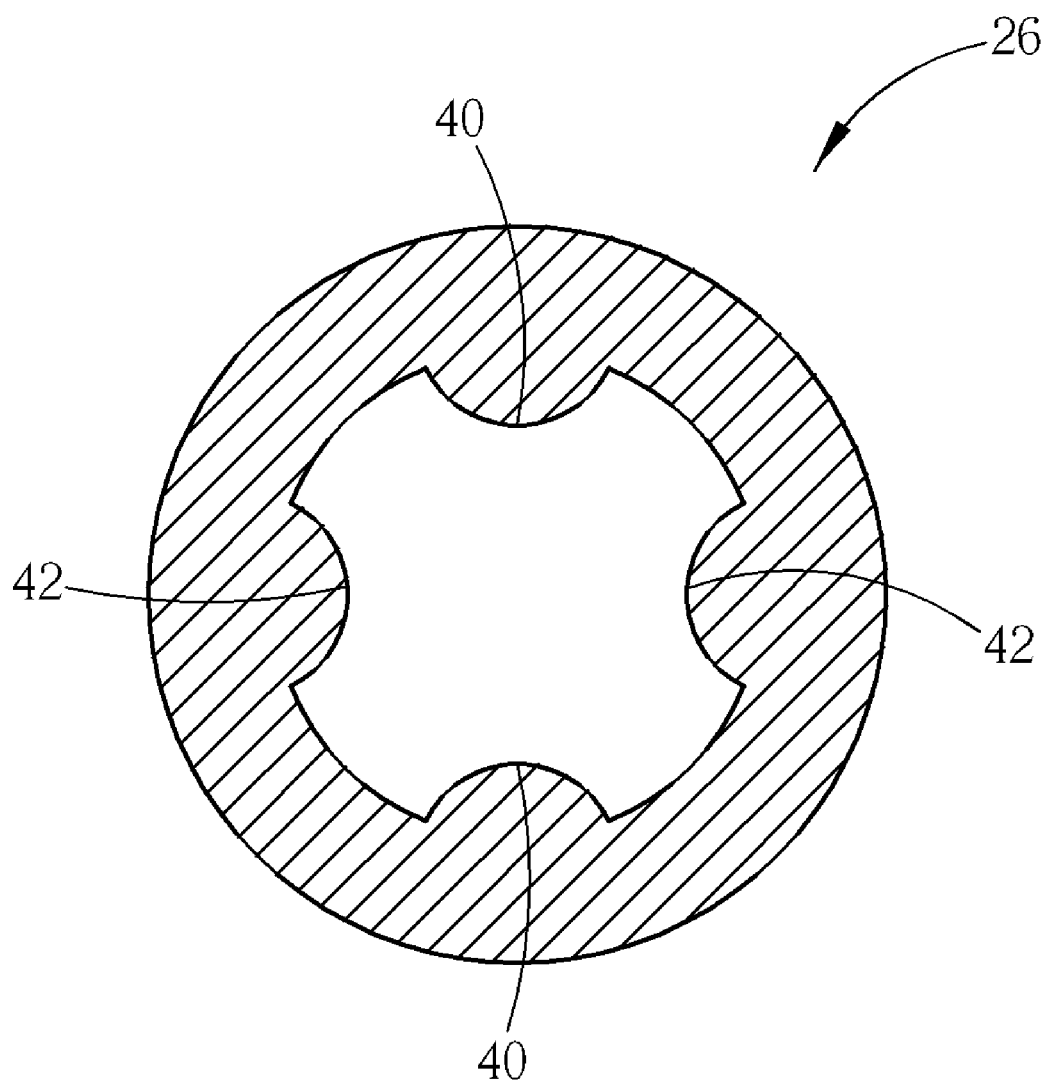
FIG. 2 is a cross-sectional diagram of a hollow knob in FIG. 1.
Figure 3:
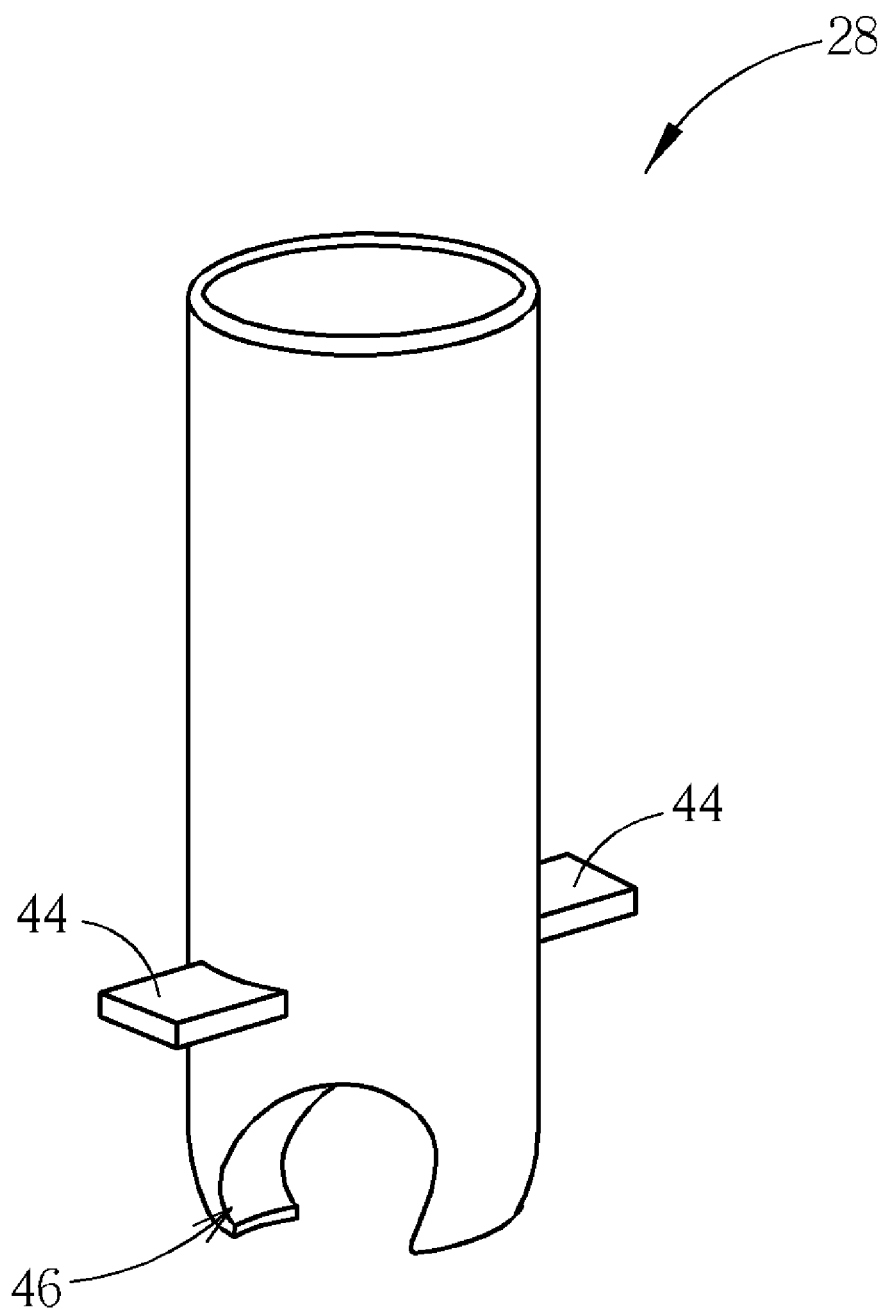
FIG. 3 is a diagram of a linkage pipe in FIG. 1.

More detailed description for the structural designs of the hollow knob 26 and the linkage pipe 28 is provided as follows. Please refer to FIG. 2 and FIG. 3. FIG. 2 is a cross-sectional diagram of the hollow knob 26 in FIG. 1. FIG. 3 is a diagram of the linkage pipe 28 in FIG. 1. As shown in FIG. 2, the hollow knob 26 is a hollow ring structure. The hollow knob 26 rotatably sheathes the light guide pipe 36. At least one first protruding portion 40 (two shown in FIG. 2) and at least one second protruding portion 42 (two shown in FIG. 2) are symmetrically formed inside the hollow knob 26 in a radial manner. Thus, the first protruding portion 40 and the second protruding portion 42 can be engaged with the engaging hole 37 of the light guide pipe 36 respectively when the hollow knob 26 respectively rotates to a corresponding position relative to the light guide pipe 36. In this embodiment, the first protruding portion 40 and the second protruding portion 42 are preferably a circular protrusion, so that the first protruding portion 40 and the second protruding portion 42 can be engaged with or disengaged from the engaging hole 37 quickly along the smooth contour of the circular protrusion. Furthermore, as shown in FIG. 1, the outer edge of the hollow knob 26 protrudes from a slot 43 of the case 12 for allowing the user to rotate the hollow knob 26 relative to the light guide pipe 36 conveniently. Next, as shown in FIG. 3, the linkage pipe 28 sheathes a side of the first lens device 18 and is connected to the hollow knob 26. That is to say, the linkage pipe 28 can rotate with rotation of the hollow knob 26 relative to the light guide pipe 36. At least one protruding piece 44 (two shown in FIG. 3) is formed at a side of the linkage pipe 28 and a claw-shaped structure 46 is formed on an end of the linkage pipe 28. The protruding piece 44 is used for engaging with the second positioning slot 34 when the hollow knob 26 rotates to a corresponding position relative to the light guide pipe 36, so as to fix a position of the linkage pipe 28 relative to the pen-nib structure 16. The claw-shaped structure 46 is used for driving the elastic piece 22 to disengage from the first positioning slot 32 of the pen-nib structure 16 when the hollow knob 26 rotates to a corresponding position relative to the light guide pipe 36. Furthermore, the claw-shaped structure 46 is separate from the elastic piece 22 when the hollow knob 26 rotates to another corresponding position relative to the light guide pipe 36, so as to cause the elastic piece 22 to engage with the first positioning slot 32.

Figure 4:
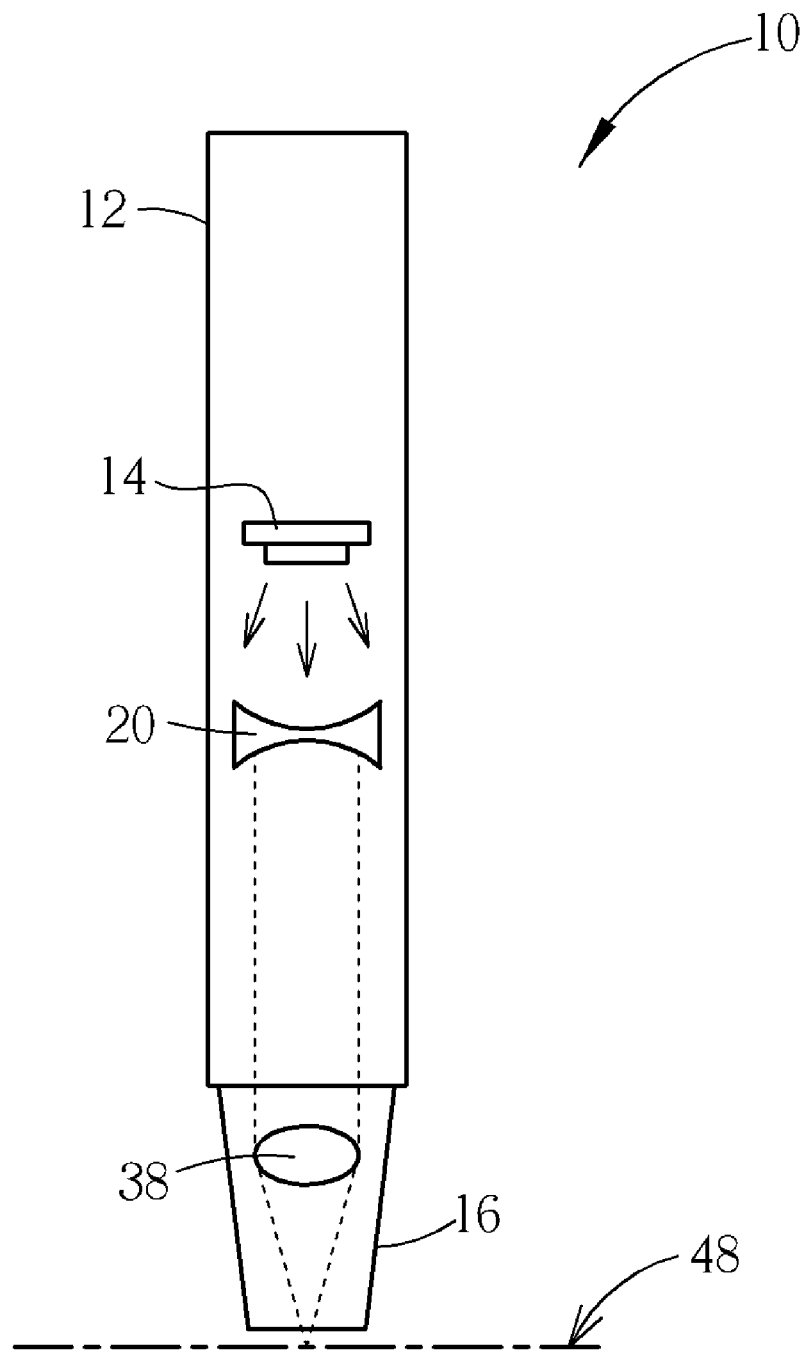
FIG. 4 is a diagram showing a position of a pen-nib structure 16 in FIG. 1 relative to a second lens device and a first lens.
Figure 5:
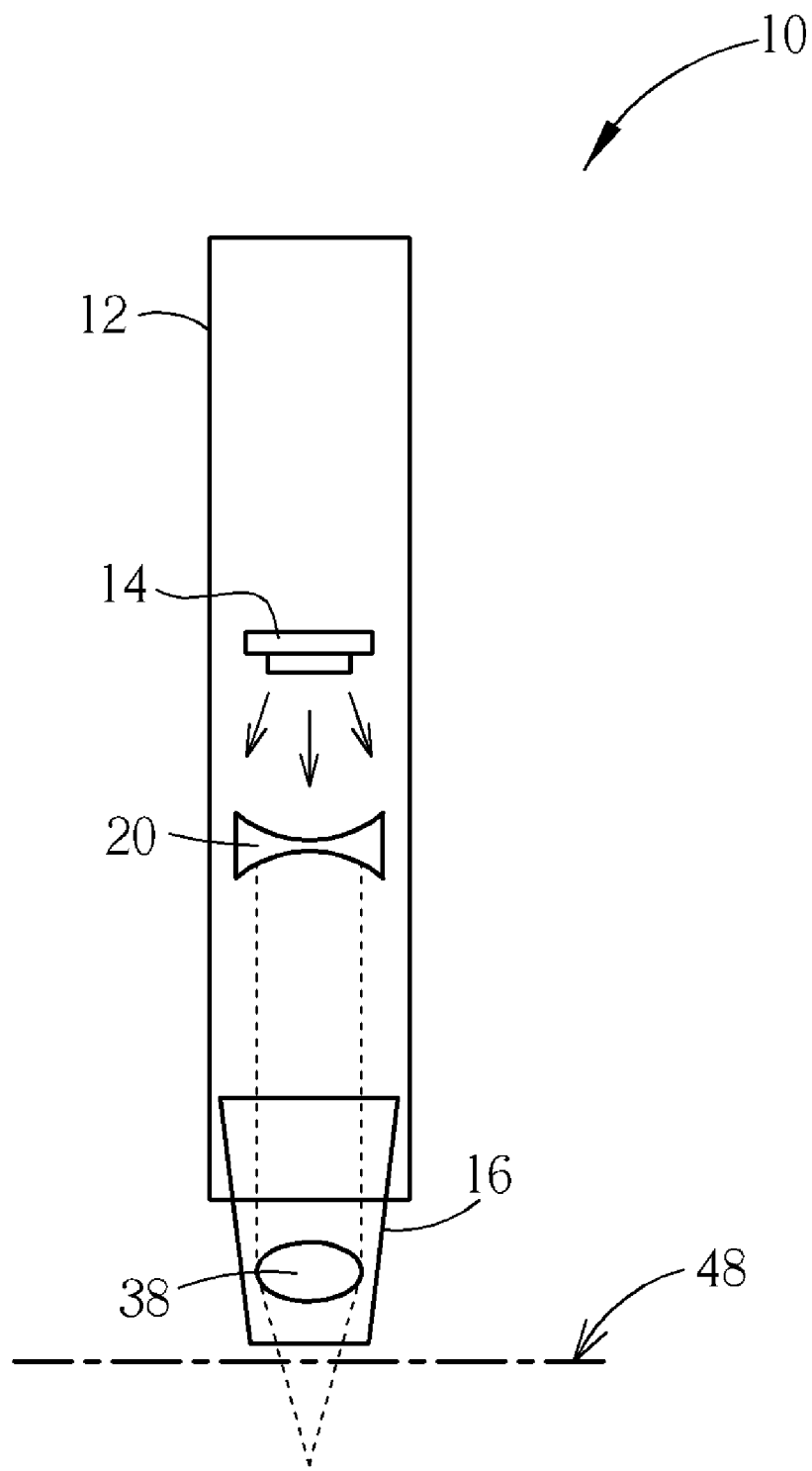
FIG. 5 is a diagram showing a position of the pen-nib structure in FIG. 4 relative to the second lens device and the first lens after moving relative to a case.

More detailed description for the light pen 10 is provided as follows. Please refer to FIG. 1, FIG. 2, FIG. 4, and FIG. 5. FIG. 4 is a diagram showing a position of the pen-nib structure 16 in FIG. 1 relative to the second lens device 20 and the first lens 38. FIG. 5 is a diagram showing a position of the pen-nib structure 16 in FIG. 4 relative to the second lens device 20 and the first lens 38 after moving relative to the case 12. In this embodiment, a user can utilize the light pen 10 to perform related operations on an optical touch panel 48 (depicted by a dotted line in FIG. 4). For example, if the user wants to use the light pen 10 to select a function icon displayed on the optical touch panel 48, the user can rotate the hollow knob 26 to a first position as shown in FIG. 1 relative to the light guide pipe 36. At this time, the first protruding portion 40 of the hollow knob 26 in FIG. 2 may be engaged with the engaging hole 37 of the light guide pipe 36 (as shown in FIG. 1), so as to constrain motion of the first lens device 18 relative to the case 12. At the same time, the claw-shaped structure 46 of the linkage pipe 28 may also rotate to a position as shown in FIG. 1 with rotation of the hollow knob 26 so as to push the elastic piece 22 away from the first positioning slot 32, meaning that motion of the pen-nib structure 16 is not constrained by the elastic piece 22 any more. In other words, the pen-nib structure 16 can move relative to the case 12. Thus, when the user rotates the hollow knob 26 to the first position as shown in FIG. 1 relative to the light guide pipe 36, the user can use the pen-nib structure 16 to abut against the optical touch panel 48 (as shown in FIG. 4). Subsequently, the user can press the light pen 10 to move the pen-nib structure 16 from a position as shown in FIG. 4 to a position as shown in FIG. 5 (at this time, the spring 24 is in a compressed state) relative to the case 12. In such a manner, as shown in FIG. 4 and FIG. 5, the beam area of the light source 14 projected on the optical touch panel 48 may be enlarged correspondingly. Thus, the optical touch panel 48 can take the enlarged beam area as Z-axis information input by the user so as to determine that the user wants to select the function icon. In summary, by rotating the hollow knob 26 to a specific position so as to make the pen-nib structure 16 capable of moving relative to the case 12, the user may use the pen-nib structure 16 to abut against the optical touch panel 48 and then press the pen-nib structure 16 to adjust the beam area of the light pen 10 projected on the optical touch panel 48. In such a manner, since the user can acquire sufficient support for his hand by abutting the light pen 10 against the optical touch panel 48 instead of holding the light pen 10 in mid-air, the user can input Z-axis information continuously and steadily so as to prevent the said operational problems (e.g. incorrect sensing of the optical touch panel 48). Furthermore, when the user stops pressing the pen-nib structure 16, the compressed spring 24 can provide elastic force to the pen-nib structure 16 so that the pen-nib structure 16 can move back to the position as shown in FIG. 4.

Figure 6:
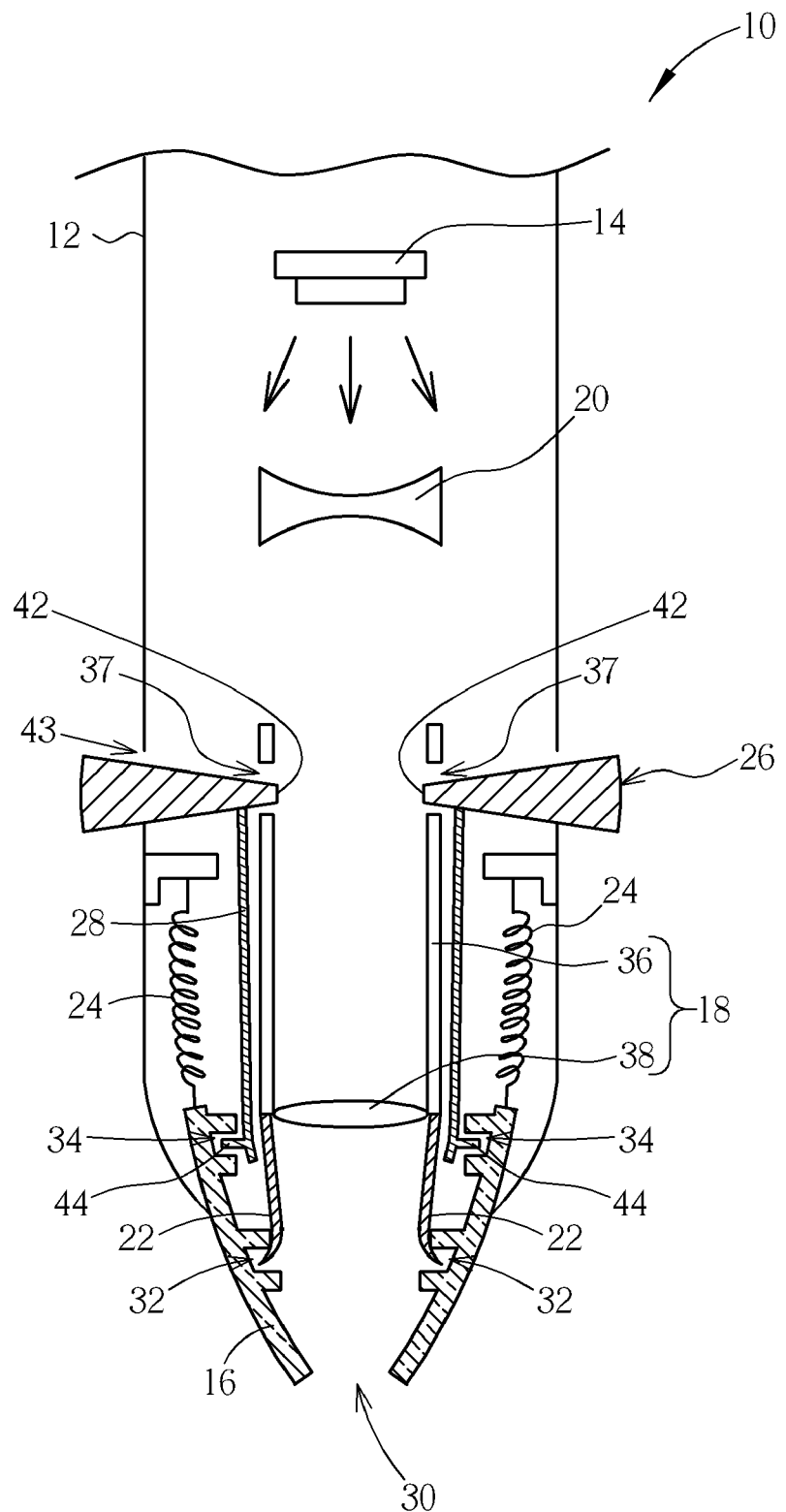
FIG. 6 is a cross-sectional diagram of the hollow knob in FIG. 1 rotating to a second position relative to a light guide pipe.

Next, please refer to FIG. 6, which is a cross-sectional diagram of the hollow knob 26 in FIG. 1 rotating to a second position relative to the light guide pipe 36. When the user wants to use the light pen 10 as a conventional pen capable of emitting light to provide light in a dark environment or to project a beam on a projection screen, the user can rotate the hollow knob 26 from the first position as shown in FIG. 1 to the second position as shown in FIG. 6. During rotation of the hollow knob 26, the first protruding portion 40, which is originally engaged with the engaging hole 37 of the light guide pipe 36, is disengaged from the engaging hole 37 along its smooth contour. Subsequently, when the hollow knob 26 rotates to the second position, the second protruding portion 42 of the hollow knob 26 as shown in FIG. 2 may be engaged with the engaging hole 37 of the light guide pipe 36 (as shown in FIG. 6) for constraining motion of the first lens device 18 inside the case 12. On the other hand, the claw-shaped structure 46 on the linkage pipe 28 may be separate from the elastic piece 22 with rotation of the hollow knob 26 so as to cause the elastic piece 22 to engage with the first positioning slot 32.

That is, the pen-nib structure 16 may be fixed at the position as shown in FIG. 6 by the elastic piece 22 and be incapable of moving relative to the case 12. At this time, the protruding piece 44 of the linkage pipe 28 as shown in FIG. 3 may also be engaged with the second positioning slot 34 of the pen-nib structure 16, so that the pen-nib structure 16 can be positioned at the position as shown in FIG. 6 more firmly. Thus, when the user rotates the hollow knob 26 from the first position as shown in FIG. 1 to the second position as shown in FIG. 6 relative to the light guide pipe 36, all components in the light pen 10 can be fixed to each other by engagement of the second protruding portion 42 and the engaging hole 37, engagement of the elastic piece 22 and the first positioning slot 32, and engagement of the protruding piece 44 and the second positioning slot 34. As a result, the user can use the light pen 10 as a conventional pen capable of emitting light without worrying that components inside the light pen 10 may move relative to each other during use of the light pen 10.

Figure 7:
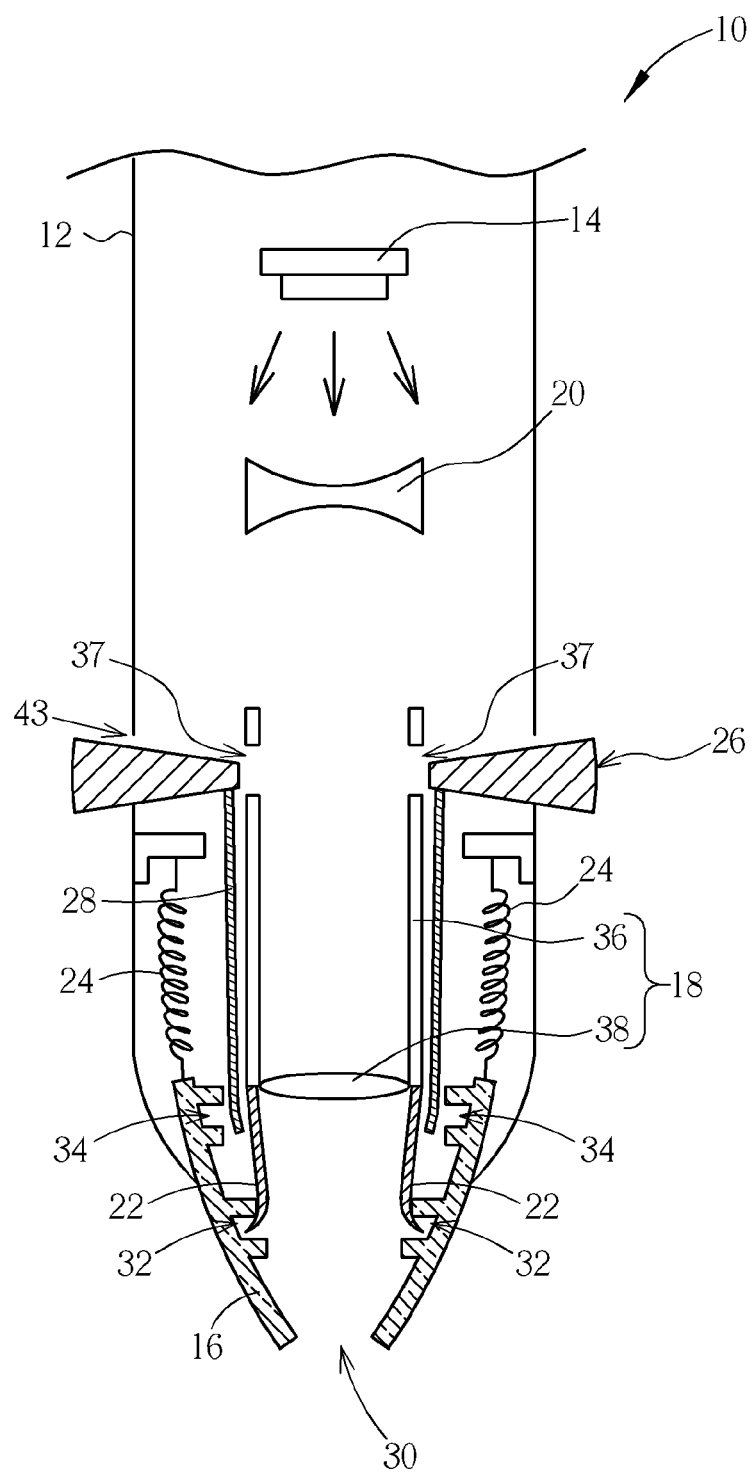
FIG. 7 is a cross-sectional diagram of the hollow knob in FIG. 1 rotating to a third position relative to the light guide pipe.
Figure 8:
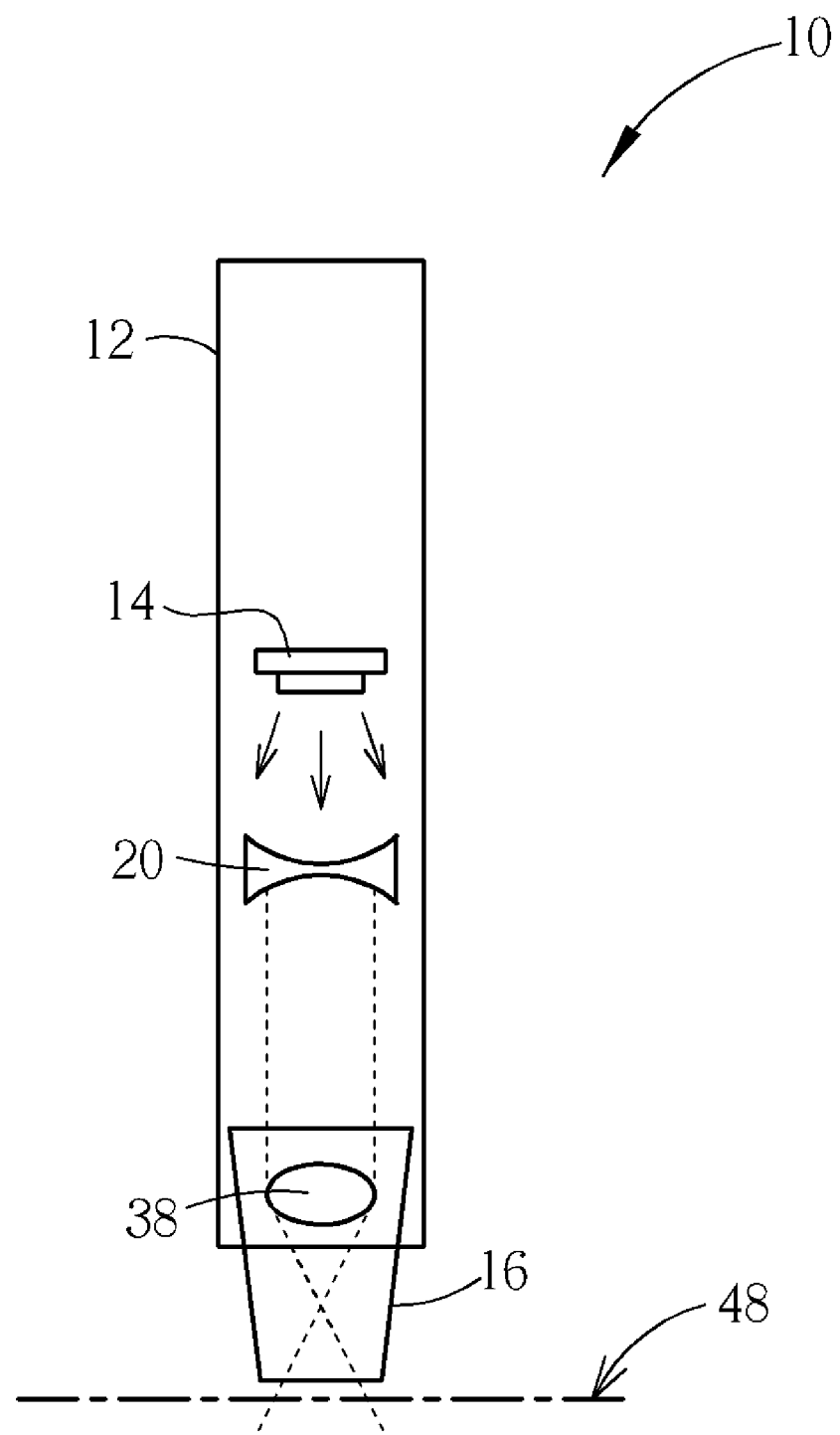
FIG. 8 is a diagram showing positions of the pen-nib structure and the first lens relative to the second lens device after moving relative to the case.

Besides utilizing motion of the pen-nib structure 16 relative to the case 12 to adjust the beam area of the light source 14 projected on the optical touch panel 48, the light pen 10 can also utilize motion of the pen-nib structure 16 and the first lens device 18 relative to the case 12 to achieve the same purpose. For example, please refer to FIG. 1, FIG. 4, FIG. 7, and FIG. 8. FIG. 7 is a cross-sectional diagram of the hollow knob 26 in FIG. 1 rotating to a third position relative to the light guide pipe 36. FIG. 8 is a diagram showing positions of the pen-nib structure 16 and the first lens 38 relative to the second lens device 20 after moving relative to the case 12. If the user wants to use the light pen 10 to select a function icon displayed on the optical touch panel 48, the user can rotate the hollow knob 26 to the first position as shown in FIG. 1 to the third position as shown in FIG. 7, wherein the first protruding portion 40 and the second protruding portion 42 are not engaged with the engaging holes 37. That is to say, during rotation of the hollow knob 26, the first protruding portion 40 may move away from the engaging hole 37 correspondingly. On the other hand, when the hollow knob 26 rotates to the third position, the claw-shaped structure 46 may also be separate from the elastic piece 22 correspondingly with rotation of the hollow knob 26, so that the elastic piece 22 may be engaged with the first positioning slot 32 accordingly. In other words, since the first protruding portion 40 and the second protruding portion 42 are not engaged with the engaging holes 37 and the elastic piece 22 is engaged with the first positioning slot 32, the pen-nib structure 16 and the first lens 38 can move together relative to the case 12. Thus, when the user rotates the hollow knob 26 to the third position as shown in FIG. 7 relative to the light guide pipe 36, the user may hold the light pen 10 to abut the pen-nib structure 16 against the optical touch panel 48 (as shown in FIG. 4). At this time, since the pen-nib structure 16 and the first lens 38 can move together relative to the case 12 as mentioned above, the user may press the light pen 10 to move the pen-nib structure 16 and the first lens 38 from the position as shown in FIG. 4 to the position as shown in FIG. 8 (at this time, the spring 24 is in a compressed state). In such a manner, as shown in FIG. 4 and FIG. 8, the beam area of the light source 14 projected on the optical touch panel 48 may be enlarged correspondingly. Thus, the optical touch panel 48 may take the enlarged beam area as Z-axis information input by the user so as to determine that the user wants to select the function icon. In summary, by rotating the hollow knob 26 to a specific position so as to make the pen-nib structure 16 and the first lens device 18 capable of moving together relative to the case 12, the user can use the pen-nib structure 16 to abut against the optical touch panel 48 and then press the pen-nib structure 16 to adjust the beam area of the light pen 10 on the optical touch panel 48. In such a manner, since the user can acquire sufficient support for his hand by abutting the light pen 10 against the optical touch panel 48 instead of holding the light pen 10 in mid-air, the user can input Z-axis information continuously and steadily so as to prevent the said operational problems (e.g. incorrect sensing of the optical touch panel 48). Similarly, when the user stops pressing the pen-nib structure 16, the compressed spring 24 can provide elastic force to the pen-nib structure 16 so that the pen-nib structure 16 can move back to the position as shown in FIG. 4.

Furthermore, in the present invention, the second lens device 20, the second protruding portion 42 of the hollow knob 26, the protruding piece 44 of the linkage pipe 36 may be an omissible component for simplifying the structural design of the light pen 10 and reducing the manufacturing cost of the light pen 10. For example, the second protruding portion 42 may be an omissible component in the light pen 10, so that a function of constraining motion of each component in the light pen 10 relative to each other may be therefore omitted. Furthermore, the said design for driving the pen-nib structure 16 to move back automatically to the position as shown in FIG. 4 is not limited to the spring 24, meaning that other structural designs commonly used for providing elastic force may also be utilized in the light pen 10, such as an elastic sheet.

Compared with the prior art, in which a light pen needs to be held in mid-air to adjust its beam area projected on an optical touch panel, a light pen provided by the present invention utilizes position adjustment of a hollow knob relative to a light guide pipe and position adjustment of a linkage pipe relative to an elastic piece to make a pen-nib structure capable of moving relative to a case. Thus, in the present invention, a beam area of the light pen projected on an optical touch panel can be adjustable. In such a manner, since a user can acquire sufficient support for his hand by abutting the light pen against an optical touch panel, the user may input Z-axis information continuously and steadily so as to prevent the aforementioned operational problems (e.g. incorrect sensing of the optical touch panel). Furthermore, use of the light pen may also vary with different positions of the hollow knob relative to the light guide pipe, so as to increase flexibility of the light pen in practical application.

Those skilled in the art will readily observe that numerous modifications and alterations of the device and method may be made while retaining the teachings of the invention.

What is claimed is:
1. A light pen comprising:
a case;
a light source disposed in the case for emitting light;
a pen-nib structure movably disposed through an end of the case, an opening being formed on the pen-nib structure;
a first lens device movably disposed between the light source and the pen-nib structure for guiding the light emitted by the light source to the opening;
an elastic piece connected to the first lens device for engaging with the pen-nib structure to fix a position of the pen-nib structure relative to the first lens device;
a hollow knob rotatably sheathing the first lens device; and
a linkage pipe sheathing a side of the first lens device and connected to the hollow knob, the linkage pipe being used for driving the elastic piece to move away from the pen-nib structure when the hollow knob rotates to a first position relative to the first lens device so that the pen-nib structure is capable of moving relative to the case and for being separate from the elastic piece when the hollow knob rotates to a second position so as to cause the elastic piece to engage with the pen-nib structure.

2. The light pen of claim 1 further comprising a spring connected between the pen-nib structure and the case for providing elastic force to the pen-nib structure.

3. The light pen of claim 1, wherein a claw-shaped structure is formed on a side of the linkage pipe, the claw-shaped structure is used for driving the elastic piece to move away from the pen-nib structure when the hollow knob rotates to the first position and for being separate from the elastic piece when the hollow knob rotates to the second position so that the elastic piece is engaged with a first positioning slot of the pen-nib structure.

4. The light pen of claim 1, wherein the first lens device comprises:
    a light guide pipe disposed through the hollow knob and connected to the elastic piece for guiding the light emitted by the light source; and
    a first lens connected to the light guide pipe for refracting the light emitted from the light guide pipe to the opening.

5. The light pen of claim 4 further comprising:
    a second lens device fixed to the case and located between the first lens device and the light source for guiding the light emitted by the light source to the light guide pipe.

6. The light pen of claim 5, wherein the second lens device is a concave lens.

7. The light pen of claim 4, wherein a first protruding portion is formed in the hollow knob, an engaging hole is formed on the light guide pipe, and the first protruding portion is used for engaging with the engaging hole so as to fix a position of the light guide pipe relative to the first lens and the case when the hollow knob rotates to the first position.

8. The light pen of claim 7, wherein the first protruding portion moves away from the engaging hole so that the first lens device can move relative to the case when the hollow knob rotates to a third position, and the linkage pipe is separate from the elastic piece so as to cause the elastic piece to engage with the pen-nib structure when the hollow knob rotates to the third position.

9. The light pen of claim 7, wherein the first protruding portion is a circular protrusion.

10. The light pen of claim 4, wherein a second protruding portion is formed inside the hollow knob, an engaging hole is formed on the light guide pipe, and the second protruding portion is used for engaging with the engaging hole so as to fix a position of the light guide pipe relative to the first lens and the case when the hollow knob rotates to the second position.

11. The light pen of claim 10, wherein the second protruding portion is a circular protrusion.

12. The light pen of claim 4, wherein the first lens is a convex lens.

13. The light pen of claim 1, wherein a protruding piece is formed on a side of the linkage pipe for engaging with a second positioning slot of the pen-nib structure so as to fix a position of the linkage pipe relative to the pen-nib structure when the hollow knob rotates to the second position.

14. The light pen of claim 1, wherein an outer edge of the hollow knob protrudes from a slot of the case.

15. The light pen of claim 1, wherein the light source is a light emitting diode (LED).

16. The light pen of claim 1, wherein the light source is a laser light source.

17. The light pen of claim 1, wherein the light is emitted through the opening to an optical touch panel.

\* \* \* \* \*